United States Patent Office 3,383,044
Patented May 14, 1968

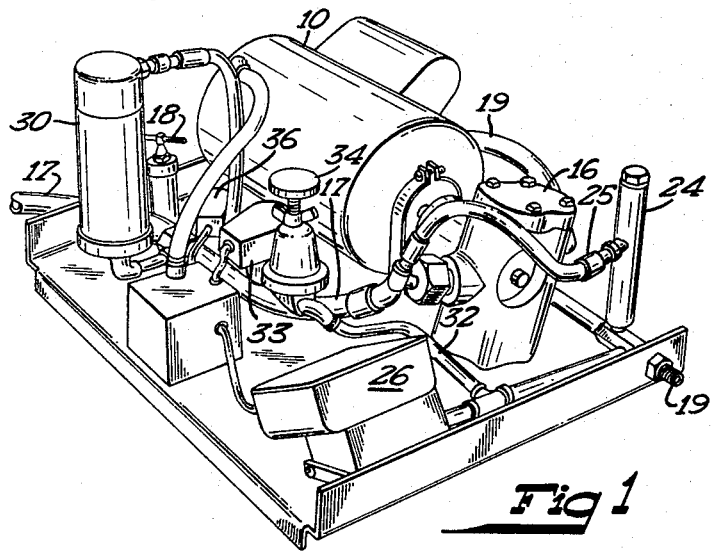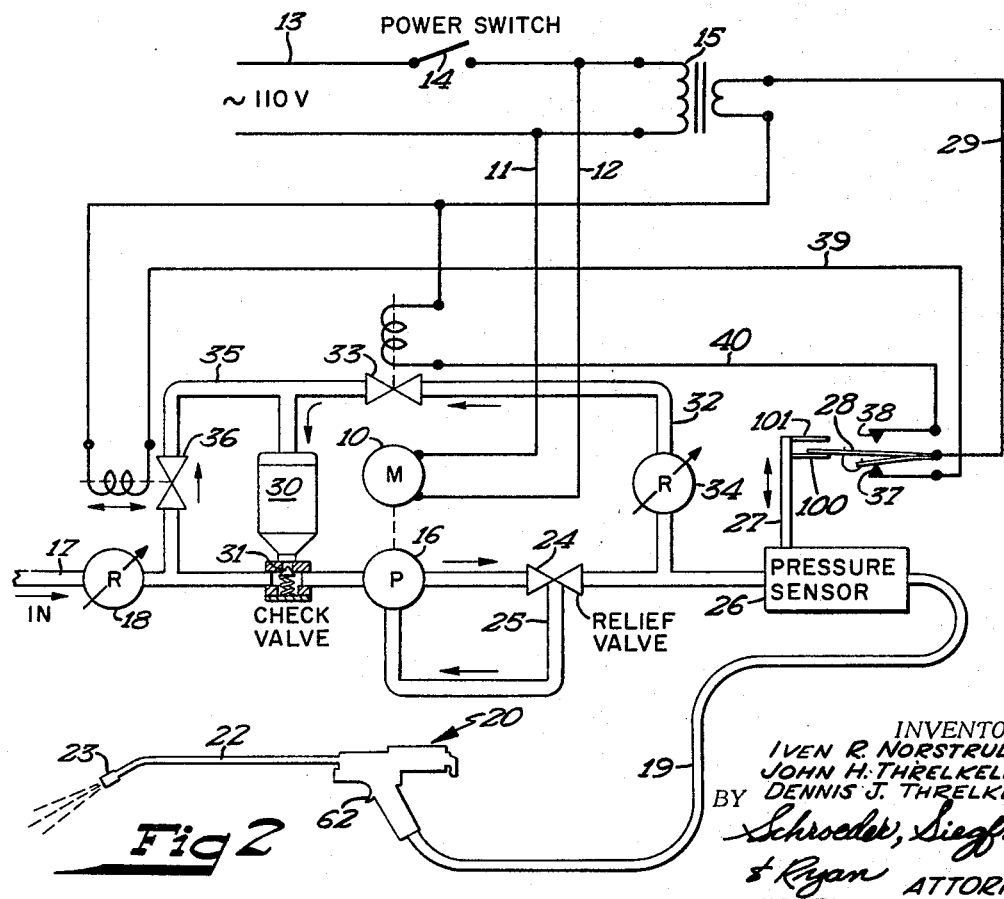

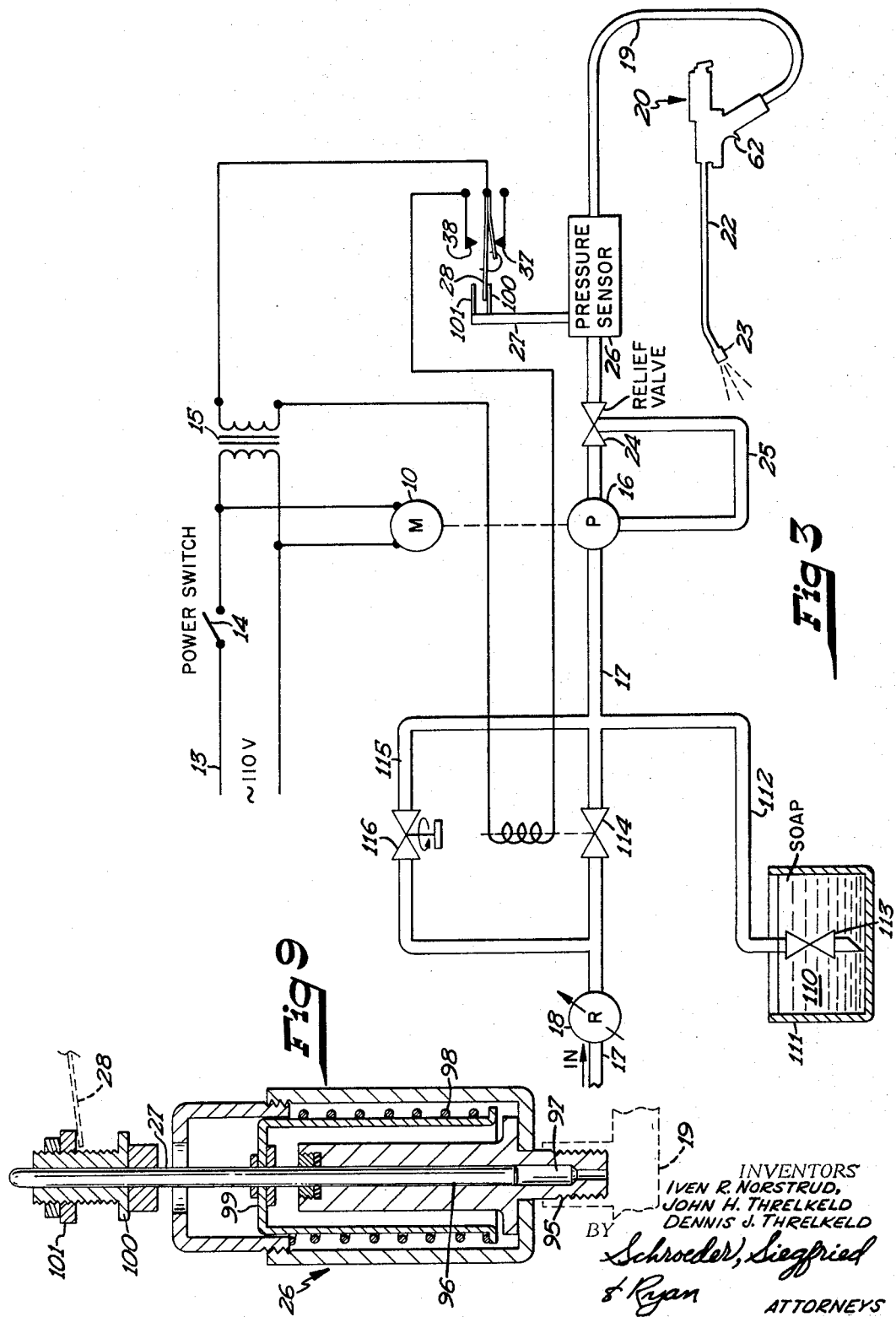

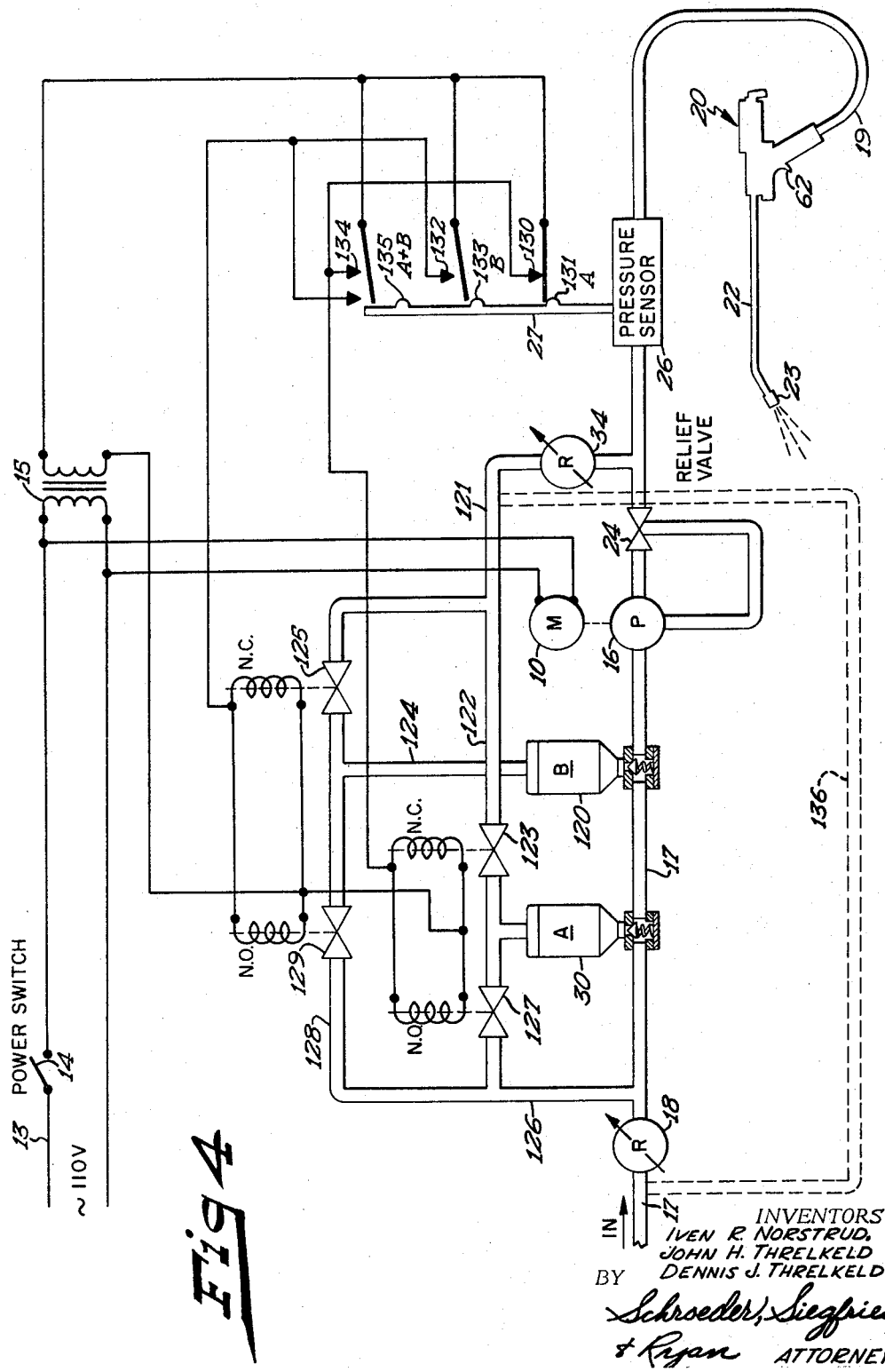

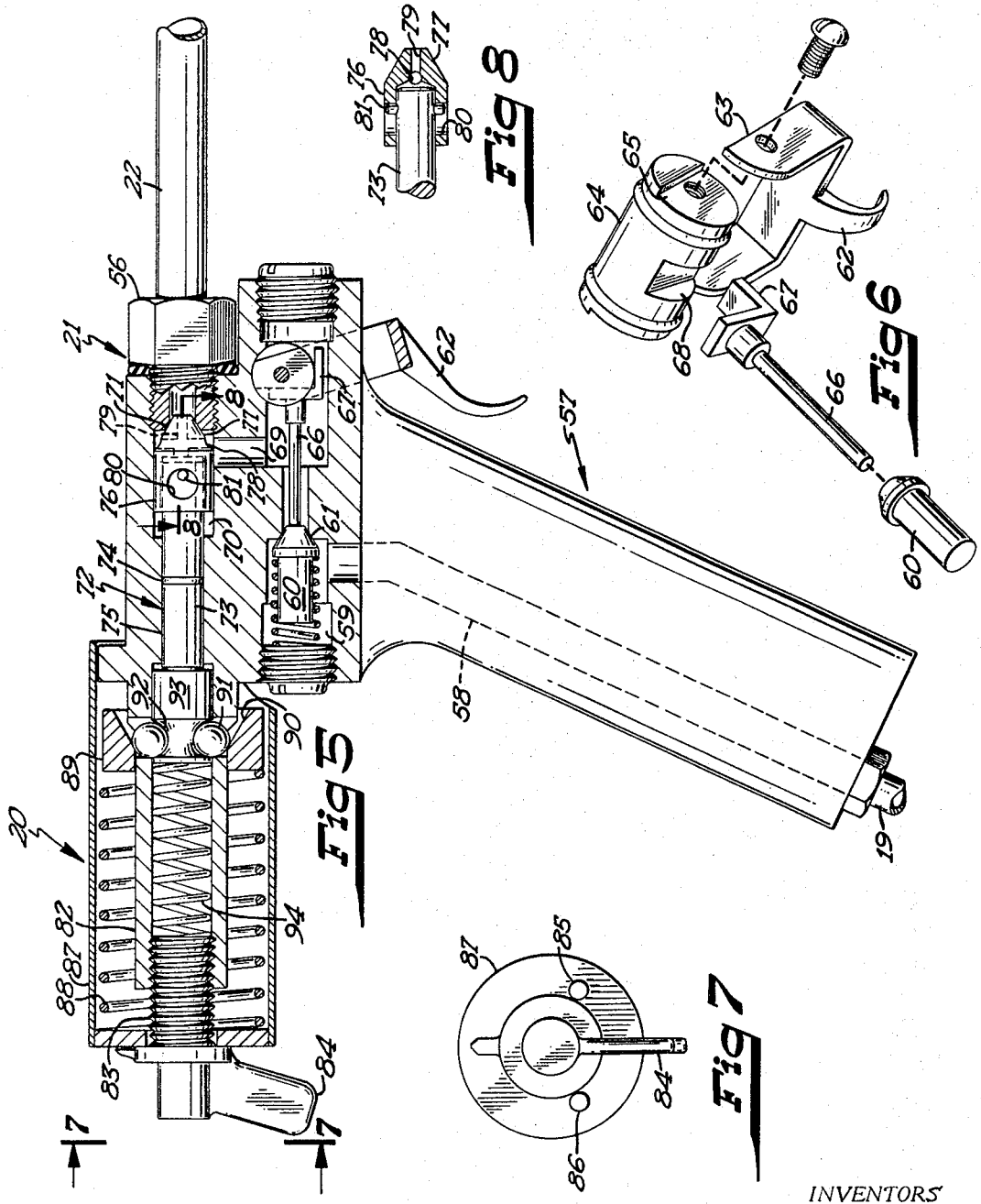

3,383,044
HYDRAULICALLY CONTROLLED
PRESSURE WASHER
Iven R. Norstrud, John H. Threlkeld, and Dennis J.
Threlkeld, Britt, Iowa, assignors to Britt Tech Corporation, Britt, Iowa, a corporation of Iowa
Filed Aug. 9, 1965, Ser. No. 478,289
24 Claims. (Cl. 239—126)

ABSTRACT OF THE DISCLOSURE

Disclosed herein is a hydraulically controlled pressure washer device adapted for washing automobiles and the like and constructed to discharge water, detergent, and other cleansing solution alone or in a mixture under relatively high pressure. The particular solution desired may be selected by the operator of the flow-directing means by merely releasing the trigger and adjusting the back-pressure control means that is carried on the gun. The gun is constructed so as to require the particular back-pressure selected to be developed within the discharge line before the flow can commence and when the flow does commence, it will always be at the same operating pressure. Through the use of pressure-sensitive control actuating means connected in the discharge line, it is possible to select the desired liquid by merely adjusting the back-pressure to be developed within the line at the gun before depressing the trigger. A pressure sensor within the discharge line activates one of a series of switches which controls the particular liquid to be discharged and the switch which is activated depends upon the extent to which the pressure sensing device reacts to the pressure developed in the discharge line.

This invention relates to pressure washer apparatus. More particularly, it relates to devices designed to wash surfaces through the use of water and liquid cleaning agents discharged selectively at relatively high pressures so as to obviate the need for rubbing, scrubbing, or the like.

It is the general object of our invention to provide a novel and improved pressure washer of simple and inexpensive design, construction, and operation.

A more specific object is to provide a novel and improved pressure washer system which is relatively inexpensive to manufacture and functions in a safe and improved manner.

Another object is to provide a novel and improved pressure washer which enables the operator to selectively discharge water or liquid cleaning agents from a discharge nozzle at the end of an elongated conduit without requiring electrical circuits to be associated with the control apparatus at the outer end of the conduit.

Another object is to provide a novel and improved pressure washer utilizing separate cleaning agents which can be selectively discharged at the discharge terminal through hydraulic instead of electrical control means, and thereby eliminate substantial danger.

Another object is to provide a novel and improved pressure washer which is substantially more simple in design and construction and hence less expensive to manufacture, operate, and maintain.

Another object is to provide a novel and improved pressure washer having novel and improved means of selectively providing the cleaning agent to the inlet of the pump for discharge thereby.

Another object is to provide a novel and improved pressure washer having novel and improved means of introducing the cleaning agent into the flow system of the washer as desired.

Another object is to provide a novel and improved pressure washer of the relatively high pressure type, constructed and designed so as to substantially reduce the load imposed upon the motor and pump when called upon to discharge cleaning solutions.

Another object is to provide a novel and improved pressure washer constructed and designed to utilize the back-pressure developed within the discharge line in order to control the liquids introduced into the pump.

Another object is to provide a novel and improved pressure washer constructed and designed to selectively adjust at the end of the discharge line the back-pressure developed within said discharge line, and utilize the same to selectively introduce desired liquids into the pump of the washer.

Another object is to provide a novel and improved fluid flow system selectively and hydraulically controlled at a point removed from but connected to the system in order to selectively control the flow of fluids through the system.

Another object is to provide a novel and improved fluid flow system which is hydraulically controlled in accordance with the back-pressure developed within the system, and wherein means is provided for selectively varying such back-pressure.

Another object is to provide a novel and improved back-pressure varying and controlling device for use within a fluid flow system.

Another object is to provide a novel and improved adjustable back-pressure varying and controlling device in combination with a back-pressure sensing device and fluid control valve to selectively control the flow of fluids through a fluid system.

Another object is to provide a novel and improved pressure washer system with hydraulic controls which utilize various back-pressure levels to selectively introduce one or more of a plurality of fluids into a system as desired.

These and other objects and advantages of our invention will more fully appear from the following description, made in connection with the accompanying drawings, wherein like reference characters refer to the same or similar parts throughout the several views, and in which:

FIG. 1 is a perspective view of one embodiment of our pressure washer.

FIG. 2 is a liquid and electrical schematic of the cleaning apparatus shown in FIG. 1.

FIG. 3 is a liquid and electrical schematic of a second embodiment of our invention.

FIG. 4 is a liquid and electrical schematic of a third embodiment of our invention.

FIG. 5 is a vertical sectional view of the back-pressure control regulator of the apparatus of FIGS. 1–2 with the handle, flow directing means, and back-pressure regulating means shown in elevation.

FIG. 6 is an exploded perspective view of the fluid control valve shown in FIG. 5 and its actuating means.

FIG. 7 is a rear elevational view of the back-pressure control regulator viewed from approximately along line 7—7 of FIG. 5.

FIG. 8 is a vertical sectional view taken through the fluid control valve of the back-pressure control regulator;

FIG. 9 is a vertical sectional view of the back-pressure sensing mechanism which is utilized in each of the systems disclosed herein.

Figure 10:
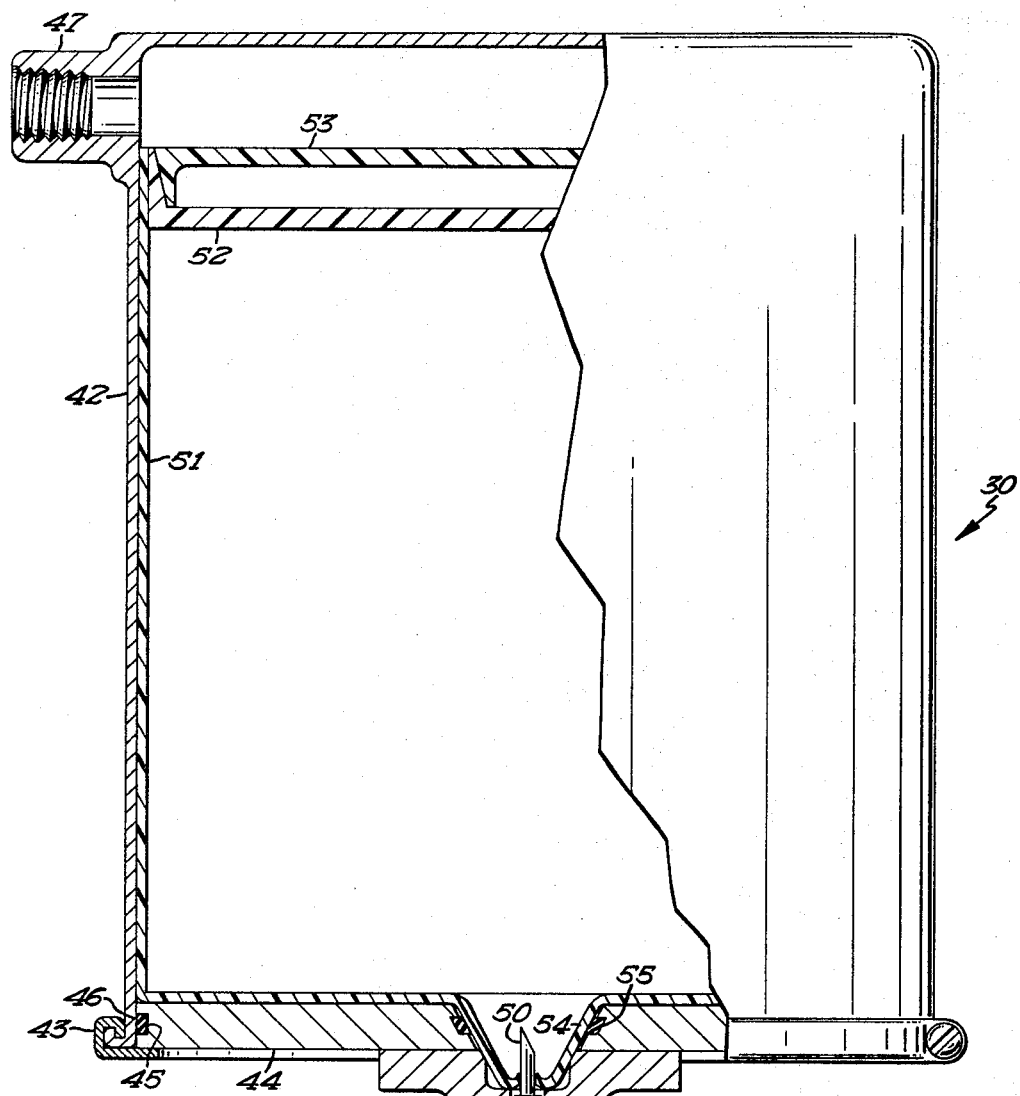
FIG. 10 is a vertical sectional view of the liquid cleaning agent container shown in FIGS. 1–2.

One embodiment of our invention as shown in FIGURES 1 and 2 may include a motor 10 which is provided with electrical current through electrical lines 11 and 12 from a power source 13, having a switch 14 and a transformer 15 connected therein. As shown, the motor 10 drives the pump 16 of the system. The switch 14 may be manual, as shown, or preferably a flow-sensitive switch of the well-known type interposed within the fluid flow line so that whenever fluid flows through the system, the switch will be closed to actuate the motor 10. Such a switch is comprised of a vane pivotally mounted within the fluid line and formed so that flow of liquid through the line causes the vane to pivot, thereby closing the switch. It is preferably made rather sensitive so as to close the switch upon even a relatively small flow through the line.

The pump 16 is provided with a water supply conduit 17 which is connected to a source of water (not shown) under pressure, such as the common city supply of water. A regulator 18 is interposed within the supply conduit 17 so as to maintain the pressure of water supplied to the pump at an even level such as approximately 35 p.s.i. The pump 16 is also provided with a discharge conduit 19 having a back-pressure control regulator 20 at its outer end portion, and a flow directing discharge 21, which carries a rigid tube or wand 22 having a spray nozzle 23 at its outer end by means of which the spray is directed against the surface to be cleaned.

Interposed within the discharge conduit 19 is a relief valve 24 which is preferably of the type shown in U.S. Letters Patent No. 3,140,049, issued to Iven R. Norstrud and John H. Threlkeld on July 7, 1964, and entitled "Cleaning Apparatus with Relief Control Valve." A conduit 25 connects the relief valve 24 to the inlet side of the pump 16 as shown.

Also interposed within the discharge conduit 19 is a pressure sensing mechanism 26, the construction of which can best be seen by reference to FIGURE 9. As illustrated schematically in FIG. 2, this pressure sensor 26 has a pressure sensitive movable control arm 27 which actuates a single pole double throw over center snap type switch 28. This type of switch is the type which remains in contact with either of the poles until forcibly moved therefrom to the other pole, and hence, the spacing between the vertically spaced horizontally extending elements 100 and 101 of the element 27 as shown in FIGS. 2 and 9 provides a latitude in the pressure levels at which the switch 28 is moved from one pole to the other.

Connected in fluid communication with the water supply conduit 17 is a rigid soap container 30, which is provided with a check valve 31 to prevent the return of water into the soap container during the rinse operation. The preferred construction of the soap container 30 and check valve 31 is shown in FIG. 10, although, of course, other means of providing a soap supply may be utilized. A pressure transmitting conduit 32 extends, from the discharge conduit 19 to the end of the soap container 30 opposite to the point at which it connects to the supply line 17, and serves to transmit pressure from the discharge conduit 19 into the interior of the soap container 30 when the normally open solenoid valve 33 is permitted to remain in open position. A pressure regulator 34 is also interposed within the pressure transmitting line 32 so as to control the pressure applied to the interior of the container 30. This regulator is preferably set at approximately 55 p.s.i. so as to exceed the pressure within the supply line 17 at the pump inlet so that a pressure differential will exist at the check valve 31 sufficient to cause soap to be forced into the supply line 17 at or ahead of the inlet of the pump 16. A pressure equalizing conduit 35 extends between the water supply line 17 and the soap container 30, as shown, to insure that the pressure can be equalized quickly with the soap container 30 when the rinsing operation is to commence. A normally open solenoid valve 36 is interposed within the conduit 35 so as to prevent flow through that conduit when soap is to be dispelled from the container 30.

At the lower pressures, the control arm 27, as shown in FIG. 2, will hold the switch 28 in registration with the contact 37 and thereby cause current to be transmitted through the lines 39 and 29 to the solenoid valve 36, thereby closing the same. In this position the system operates to discharge a mixture of water and soap or other cleaning agent, as the case may be. When the pressure within the discharge conduit is relatively high, the movable arm 27 will cause the switch 28 to move into contact with the contact 38, and thereby close the circuit to solenoid valve 33 through lines 29 and 40 and close the same. At the same time it will break the circuit to solenoid valve 36 causing it to return to open position, and thereby cause equalization of the pressure across the soap container 30, permitting quick closing of the check valve 31, and permitting transmission of pressure through the conduit 35.

Figure 2A:
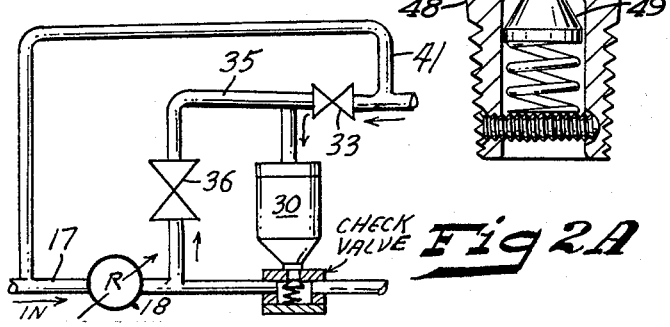
FIG. 2a is a schematic of a portion of the liquid schematic of FIGURE 2 showing an alternative pressure supply line, connected to the cleaning agent supply.

If it is desired, an alternative arrangement may be utilized to provide the necessary pressure for the soap container 30 in lieu of the conduit 32. In FIGURE 2a, a conduit 41 connected between the water supply 17 and conduit 32 will provide a greater pressure by bleeding the same off the city water supply line 17 to the soap container ahead of the regulator 18, and connecting the same to the conduit 32 and soap container 30 with the solenoid valve 33 interposed within the connection.

The back pressure regulator 20, the construction of which is best shown in FIGS. 5–7, inclusive, is constructed and arranged so that the back-pressure within the discharge conduit 19 can be varied at will. The detailed construction of the regulator 20 will be described hereinafter, and the operation of the combination shown in FIGS. 1–2, inclusive, will now be described so as to facilitate an understanding of the invention at an early point.

When the back pressure regulator 20 is set at a low pressure, the movable arm 27 will be in the position shown in FIG. 2, causing the solenoid valve 33 to remain in open position, and the solenoid valve 36 to be moved to a closed position. Thus when the trigger of the back-pressure regulator 20 is pressed to cause fluid to flow therethrough, the pump 16 will be supplied with a supply of water through the supply conduit 17 mixed with a supply of cleaning agent from the soap container 30 because the pressure within the conduit 32, being in fluid communication with the discharge side of the pump 16, will exceed the pressure within the water supply line 17 sufficiently to force the check valve 31 open and force liquid cleaning agent into the line 17. As a consequence, a mixture of water and cleaning agent will be discharged through the spray nozzle 23. However, when the back-pressure regulator 20 is adjusted so as to create a substantially higher back-pressure within the discharge conduit 19, the pressure sensor 26, which is sensitive to the back-pressure, will cause the control arm 27 to move the switch element 28 into contact with the contact 38, thereby causing the solenoid valve 33 to move to closed position and the solenoid valve 36 to return to open position. As a consequence, fluid communications between the container 30 and the discharge conduit 19 will be terminated, while fluid communication will be established between the interior of the container 30 and the water supply line 17 via the conduit 35 and valve 36. In this manner the pressure within the container 30 and within the water supply line 17 leading to the pump is immediately equalized, and the check valve 31 will be closed, thereby preventing any additional discharge of cleaning agent into the line 17. As a consequence, only water will be discharged through the spray nozzle 23, and the system will be operating on what is known as the rinse position.

If the motor 10 is permitted to continue to operate after the trigger of the back-pressure regulator 20 has been released to cut off the discharge, the pressure will continue to build up until the relief valve 24 is forced to be unseated, and flow is permitted through the conduit 25 back to the inlet of the pump. When this takes place, the back-pressure immediately drops to 200 p.s.i., which is substantially lower than the operating pressure of the system. The relief valve 24 is constructed, in accordance with U.S. Patent No. 3,140,049 so as to require a pressure in excess of 750 p.s.i. to open the same. This pressure is substantially in excess of the operating pressure of the system, which is approximately 500–550 p.s.i.

The construction of the liquid cleaning container 30 is best shown in FIG. 10. As shown, it is comprised of a steel cartridge 42 which is connected by an interrupted lock ring 43 to a base plate 44. An annular groove 45 within the base plate accommodates an O-ring 46 to perfect a seal between the lower end of the cartridge 42 and the base plate. The upper end of the cartridge 42 is provided with an inlet connection 47, which is connected to the conduits 32 and 35 as shown in FIG. 2. Thus the interior of the cartridge 42 is in fluid communication with the interior of the conduits 35 and 32. A threaded discharge connection 48 carries a spring loaded check valve 49 which has a bayonet-type piercing element 50 at its upper end in order to pierce a sealed cleaning-agent-containing cartridge 51. The cartridge 51 is preferably made of plastic or other readily piercable material and contains a supply of the cleaning agent, such as soap or detergent.

A rigid cup-shaped element 52 seals off the upper end of the cartridge 51 and cooperates with an inverted cup-shaped follower plate 53 which rides therewithin in superimposed relation and transmits the fluid pressure provided by the water forced into the inlet connection 47 to the interior of the cleaning agent container 42, thereby causing the cartridge 51 to collapse and expel the liquid cleaning agent therein past the check valve 49 and into the water supply line 17 which leads to the inlet of the pump. It will be noted that the lower end of the cleaning agent cartridge 51 is provided with a downwardly extending neck 54 to perfect a seal with an O-ring 55, which is carried in a groove provided for that purpose in the base plate 44.

The construction of the back-pressure regulator 20 is best shown in FIGS. 5–7, inclusive. Reference to FIG. 5 discloses that the regulator is incorporated within a pistol shaped member which is designed so as to facilitate application of the water and cleaning agents, and includes flow directing means 21 in the form of a threaded tubular member 56 into which the tube or wand 22 is threaded. The handle of the pistol shaped member 57 has a passage 58 therein which leads to a chamber 59 within which a spring loaded valve member 60 is positioned and caused to bear against a valve seat 61 to control the flow of water through the system. Whether any liquid flows through the system or not depends upon whether the valve 60 is in open or closed position. This valve 60 may be moved to open position by pressing the trigger 62 which is rigidly secured to a U-shaped bracket 63, which in turn is fixedly secured to a cylinder 64 that is pivotally mounted within the member 57 for rotation about its axis. The ends of the cylinder 64 are cut away as best shown in FIG. 6 at 65 so that upon movement of the trigger 62, the cylinder 64 will be caused to rotate. An actuating rod 66 which engages the forward end of the valve member 60 carried an L-shaped member 67 at its forward end. This L-shaped member 67, as best shown in FIGURE 5 engages the cylinder 64 within a slot 68 formed in its peripheral surface, as best shown in FIGURES 5 and 6, so that upon movement of the trigger 62 by applying pressure thereto, the actuating rod 66 will be moved against the pressure of the spring loaded valve 60 and cause the same to be opened.

The chamber 59 communicates by means of the passageway 69 with a chamber 70 of the back-pressure control regulator. The flow directing means 21, which was threaded into the forward end of the member 57 has a valve seat 71 at its inner end. This valve seat 71 is adapted to cooperate with a valve member indicated generally by the numeral 72 in controlling the back-pressure to be developed within the discharge conduit 19. The details of the valve member 72 can best be seen by reference to FIG. 8.

The back-pressure control valve 72 is comprised of a piston member 73 which is encircled by an O-ring 74 within a groove provided in the circumference of the piston to perfect a seal between the piston and the cylinder wall 75 which extends rearwardly from the chamber 70. Thus, any pressure transmitted to the interior of the chamber 70 is applied to the piston 73 and tends to urge the same rearwardly or to the left as viewed in FIG. 5. The valve member 72 also includes a hollow valve head 76 which has a conically shaped forward end 77, a transverse bore 78 and an axial bore 79 which communicates therewith. The bore 79 extends rearwardly from the forward end of the valve head, and, of course, communicates with the area surrounding the forward end of the piston 73 so that when fluid enters the chamber 70, it bears against the end of the piston as well as against the interior and exterior of the valve head 76. A lost motion connection is effected between the piston 73 and the head 76 by means of a circular opening 80 formed through the wall of the valve head 76, and an upstanding pin 81 which is carried by the forward end portion of the piston 76. It will be noted that the bore 79 is smaller than the bore of the flow directing means 21. In practice, the bore 79 is approximately ⅟₁₆ inch in diameter. It must be small enough to build up sufficient back-pressure to exceed the strength of the springs (to be hereinafter described) urging the valve member 72 forward, and it should be large enough to permit the relief valve 24 to reseat when the trigger 62 is originally pressed.

Extending rearwardly from the pistol shaped member 57 is a tubular element 82, the rear end portion of which has threads formed in its interior surface to accommodate a threaded adjustment screw 83. As shown in FIG. 5 and 7, this adjustment screw 83 has a handle 84 by means of which the screw may be swung between extreme positions controlled by two outwardly extending pins 85 and 86 carried by the rear end portion of a slidable sleeve member 87. The slidable sleeve member 87 surrounds a relatively strong spring 88 which in turn surrounds the tubular member 82, and bears against a ring member 89 having a bevelled inner surface 90 which functions to hold a plurality of ball members 91 within a circumferential groove 92 formed in the exterior of a cylindrical slidable member 93. This slidable member 93, as best seen in FIG. 5, is disposed within the bore of the tubular member 82, and transmits pressure to the rear end of the valve 72 as supplied by the spring 88 through the ring 89 and the balls 92, as well as by the spring 94, which is disposed within the tubular member 82. It will be understood, of course, that openings are provided in the wall of the tubular member 82 within which the balls 91 lie. It will also be understood that the lower portions of the sleeve 87 are cut away to permit the sliding movement of that member relative to the tubular member 82.

It will be seen that the adjustment screw 83 is threaded into the tubular member 82 sufficiently far so that when the trigger 62 is not pressed, the springs 88 and 94 transmit sufficient pressure to move the valve member 72 to its forwardmost position, whereat the conically shaped face 77 of the valve head 76 bears against the valve seat 71, and the lost motion connection pin 81 bears against the forward edge of the portions of the valve head which define the opening 80. Thus the piston 73 is in its forwardmost position as is the valve head 76. When in this position, the transverse bore 78 still communicates with the passageway 69 which brings the chamber 70 into communication with the valve seat 61.

It will be readily appreciated that when the end of member 84 is swung to one extreme position, greater pressure will be exerted upon the balls 91 and the pressure transmitting member 93 than when the handle member is in the opposite extreme position. By regulating the tension placed upon the springs 88 and 94, we have found that we can vary and control the back-pressure created within the discharge conduit 19, since we can control the pressures at which the valve head 76 will be caused to be drawn rearwardly and unseated. For example, if the regulator is set at the minimum pressure or cleaning agent position, the resilient urging of the sliding valve element 72 forward is at the minimum, and hence when the trigger 62 is pressed, the valve element will retract as soon as operating pressure is reached (almost at once) and the cleaning agent and water will be discharged from the spray nozzle 23 because the normally open solenoid valve 33 will remain open since normal operating pressure of 500 p.s.i. will not actuate the pressure sensing detector 26 sufficiently to cause the switch element 28 to contact the contact 38.

When the tension adjustment is increased by moving the lever 84 to the high tension or rinse position, the springs 88 and 94 hold the piston member 72 in its forward-most position more securely, and as a consequence, when the trigger 62 is pressed, the pressure will rise to approximately 600–650 p.s.i. before the piston 72 will move rearwardly and unseat the valve head 76 from the valve seat 71. As soon as the valve head 76 is withdrawn from the seat 71 by the lost motion connection 81, then the pressure will immediately drop again to approximately 500–550 p.s.i. which is the operating pressure. Hence the pressure within the line 19 drops to operating pressure of 500–550 p.s.i. after each time the trigger 62 is pressed, irrespective of the pressure attained to unseat the valve head 76. While the pressure is mounting prior to removal of the valve head 76 from the seat 71, the control arm 27 will be caused to move the switch element 28 into engagement with the contact 38, thereby closing the solenoid valve 33 and opening the solenoid valve 36 to cause only water to be supplied to the pump and to be discharged through the spray nozzle 23. The lowering of the pressure again to the operating pressure of 500–550 p.s.i. is not sufficient to cause the control arm 27 to break the circuit to the solenoid valve 33, and consequently only water will continue to be supplied to the pump 16.

If it is desired to discharge a mixture of water and cleaning agent from the spray nozzle 23 immediately after only water has been discharged therefrom, it is necessary to turn the screw member 83 to the lower compression or pre-cleaning agent position, and release the trigger so as to stop the flow of the liquid through the system. Upon releasing the trigger and stopping the flow through the system, the valve head 76 will again reseat, and the pressure control arm 27 will move the switch element 28 back into contact with the contact 37, thereby closing solenoid 36 and permitting solenoid 33 to move to open position. Consequently, when the trigger is again pressed, cleaning agent and water will be discharged. The sliding valve member 72 will remain in its forward-most position until the pressure has increased to the operating pressure of 500 p.s.i. (a matter of seconds) and then will move rearwardly with the pistons 72, the restriction of the orifice or bore 79 being sufficient to produce a back-pressure of approximately 500 p.s.i.

Whenever the trigger 62 is released, the pressure within the line continues to build up until relief valve 24 releases at about 750 p.s.i. and then the pressure within the line drops to about 200 p.s.i. at which level it remains open. Upon applying pressure to this trigger 62 again, the relief valve closes or reseats immediately and the pressure again builds up quickly to operating pressure of 500–550 p.s.i. or higher, if required, to unseat the valve member 72.

FIG. 9 shows a vertical sectional view of the back-pressure sensing mechanism 26. As shown, it is connected by means of a connection 95 in fluid communication with the discharge conduit 19, and includes a piston or plunger 96 mounted within a cylinder 97 which is arranged in fluid communication with the interior of the conduit 19, and is urged in one direction by a spring 98 that surrounds an inverted cup-shaped member 99 connected to the piston 96 so as to move therewith. The other end portion of the piston 96 carries the control arm 27 which has a pair of spaced switch actuating members 100 and 101. These switch actuating members 100 and 101 are positioned so that the member 101 moves the switch into contact with contact 37 at approximately 250 p.s.i. The switch actuating member 100 moves the switch into contact with contact 38 at approximately 600–650 p.s.i. At pressures intermediate said levels, the arms 100 and 101 will not cause the switch 28 to change its position since it is of the type which remains in a given position until forcibly moved towards its other position and then snaps into the other.

FIG. 3 discloses a second embodiment of our invention applied to the use of a cleaning agent which is not placed under pressure, and utilizes the principle of starving the pump as described and claimed in U.S. Patent No. 3,058,668. Most of the elements are identical in construction with that disclosed and identified with respect to FIGS. 1–2, inclusive, and consequently the same numerals have been applied thereto. However, in lieu of the pressurized supply of soap or other cleaning agent, we have in this embodiment provided a non-pressurized supply 110 within a container 111 and connected by a conduit 112 with the inlet of the pump 16. A check valve 113 prevents return of water into the supply of cleaning agent. As described in U.S. Patent No. 3,058,668, the cleaner will be supplied to the pump only when an inadequate supply of water is made available thereto. In other words, by starving the pump 16, the cleaning agent may be drawn upwardly through the conduit 112 into the pump. The starving action upon the pump is effected by closing solenoid valve 114 so that a reduced supply of water will be furnished through the by-pass conduit 115 with the adjustable valve 116 disposed therewithin. Thus it will be readily appreciated that when the back-pressure regulator 20 is adjusted so as to provide the lower back-pressure, the movable control arm 27 will be in the position shown in FIG. 3 and as a consequence normally closed solenoid valve 114 will be closed, resulting in starving of the pump and drawing of the cleaning agent upwardly through the conduit 112 to mix with the water at or ahead of the pump inlet or within the pump itself. When the back-pressure regulator 20 is set at the high pressure or rinse position, the switch element 28 will be in contact with the contact 38 and cause the normally closed solenoid 114 to be moved to open position, thereby providing more than an adequate supply of water to the inlet of the pump, and consequently terminating starving of the pump and drawing of a cleaning agent from the container 111. As a result, only water will be discharged from the nozzle 23. It should be noted that the relief valve 24 is connected by the by-pass 25 with the pump 16 just as in the embodiment shown in FIGS. 1–2. It will be appreciated that the control of the back-pressure within the discharge conduit 19 is controlled by the pressure regulator 20 in exactly the same manner as is hereinbefore described with respect to the embodiment shown in FIGS. 1–2.

The third embodiment which is shown in FIG. 4 is also based upon the control of the system by hydraulic means through variation of the back-pressure within the discharge conduit 19. The elements used which are in common with those shown in FIGS. 1–2 have been identified by the same numerals, and their construction is identical therewith. The principal difference between the system shown in FIG. 4 and that shown in FIG. 2 is that a plurality of cleaning agent containers are utilized in such a way as to provide either one or both of the cleaning agents contained therein selectively. As shown, there is a cleaning agent container 30 and a second cleaning agent container 120. Each of these containers and their associated check valves are constructed identically with that shown in FIG. 2 and FIG. 10. It will be noted that a pressure transmitting conduit 121 is connected by a conduit 122 in fluid communication with the cleaning agent container 30 with a normally closed solenoid valve 123 disposed within the conduit 122. The conduit 121 is also connected by a conduit 124 with the second cleaning agent container 120 with a normally closed solenoid 125 disposed within the conduit 124. The cleaning agent container 30 is connected to the water supply line 17 behind the regulator 18 by a conduit 126, which has a normally open solenoid valve 127 disposed therewithin. The cleaning agent container 120 is also connected to the water supply conduit 17 rearwardly of the regulator 18 by means of a conduit 128 within which is disposed a normally open solenoid valve 129.

The normally closed solenoid 123 is electrically connected, as shown, with a cam actuated single pole single throw over center switch 130. The cam 131 is positioned so as to move switch 130 into closed position (but not to pass it) when the control lever 84 is set so as to cause the pressure in the line 19 to rise to approximately 600 p.s.i. When this switch 130 is actuated by the lowermost cam 131 of the control arm 27 of the pressure sensor 26, the solenoid valve is moved to open position with the result that the fluid pressure from the discharge conduit 19 is transmitted through the conduit 121 and the valve 123 into the interior of the liquid cleaning agent container 30, causing the cleaning agent to be expelled into the interior of the water supply line 17 and mixed with the water supply to the pump 16. As a consequence, a mixture of water and the cleaning agent contained within the container 30 will be expelled from the nozzle 23 when the trigger 62 is pressed, assuming that the pressure regulating lever 84 is set at the lowest pressure position.

The second cam actuated switch 132 is positioned so as to be closed by the cam 133 at an intermediate pressure level above that at which the switch 130 is actuated. It will be noted that each of the cams and associated switches are positioned so that only one switch will be closed at any given pressure created within line 19 by a particular setting of lever 84 and that each of the switches are of the same type. If desired, simple latching type switches may be utilized. When the control lever 84 is adjusted so as to cause the control arm 27 to move to a position such that the cam 133 will close switch 132 (at approximately 650 ps.i.), the normally closed solenoid valve 125 will be moved to open position, and the normally open solenoid valve 129 will be moved to closed position. When this takes place, fluid pressure will be transmitted through the conduit 124 to the interior of the cleaning agent container 120, and a portion of the contents thereof will be expelled into the water supply line 17 ahead of the pump and will be discharged through the discharge nozzle 23 by the pump. It will be noted that at the same time the switch 130 will be opened by the cam 131 during its return to operating pressure position so that the normally closed solenoid valve 123 will return to closed position and the normally open solenoid valve 127 will return to open position. Thus, the pressure will be equalized across the container 30 while excess pressure will be applied to the interior of container 120.

When the back-pressure regulator 20 is adjusted to a second intermediate position such that the control arm 27 will shift at a pressure approximately 700 p.s.i. so that switch 134 will be closed by cam 135, cams 133 and 131 will clear their associated switches and open them again during their descent to operating pressure level. Closure of switch 134, however, actuates the circuits to each of the normally closed solenoid valves 123 and 125, and closes the normally open solenoid valves 127 and 129 so that the fluid pressure will be transmitted through conduits 122 and 124 to the interior of containers 30 and 120. As a consequence, a blend of the cleaning materials contained in containers 30 and 120 will be expelled into the interior of the water supply line 17 and discharged through the pump and spray nozzle 23.

When it is desired to have clear water discharged from the pump, the pressure regulating mechanism of the regulator 20 is adjusted to the high compression or rinse position (in excess of 700 p.s.i.) so as to increase the back-pressure within the conduit 19 to a level substantially above that necessary to actuate switch 130, 132 and 134. When the control arm 27 has been forced by the increased back pressure sufficiently far so that each of the cams 131, 133 and 135 clear this respective switches 130, 132 and 134 and open them again during their descent to operating pressure level (500 p.s.i.), the solenoid valves 123, 125, 127 and 129 will each be in their normal position so that valves 123 and 125 will be closed while valves 127 and 129 will be open. In this position, the pressure will be equalized across each of the containers 30 and 120, and only water will be supplied to the pump 16 so that the rinsing operation may be completed. It will be understood that in each instance the trigger 62 is to be released when changing from one back-pressure to another in order that the valve head 76 may return to seated position relative to the valve seat 71 in order to cause the control arm 27 to be moved to the desired position required to actuate the associated switch.

An alternate pressure transmitting line has been shown in broken lines and identified by numeral 136. This line may be used, in lieu of the connection with line 19, to provide pressure for the cleaning agent containers 30 and 120.

From the above it will be seen that we have provided a novel and improved pressure washer system which is simple and inexpensive in design, construction and operation. It will be noted that we have completely eliminated any requirement for electrical currents at the point of discharge of water and/or cleaning agent. This makes such a washing operation substantially safer in that there is no possibility of electrocution. Also, it eliminates the requirement for electrical lines being carried along the discharge conduit 19 and at the point of application. It will also be seen that we have provided means whereby selective control of the material to be discharged can be accomplished simply and inexpensively with a minimum of controls and with the cleaning agent being supplied through use of a positive pressure. Moreover, we have facilitated the supply of the cleaning agent by providing a disposable cartridge which can be removed from the container 30 readily and easily when emptied and disposed of, with a second cartridge substituted therefor within the container 30. This greatly facilitates the handling of the cleaning agent. It will be noted that our washing system is extremely compact and that the number of parts required therefor have been reduced to a minimum. Through the use of a back-pressure sensitive control means, we have eliminated a substantial expense in the manufacture of this type of system in that numerous valves, etc., are no longer required.

It will be readily appreciated that a three way valve could be utilized at the head of each of the cleaning agent containers 30 and 128 in lieu of the pairs of solenoid valves 33, 36 or 123, 127, or 125, 129. Such a valve would be positioned, of course, at the point where the conduits 32, 35, or 122, 126, or 121, 128 meet and would be arranged so that when one of each such pairs of conduits will communicate with the interior of its associated cleaning agent container, the other will be placed in non-communicating relation therewith.

It will, of course, be understood that various changes may be made in the form, details, arrangement and proportions of the parts without departing from the scope of our invention which consists of the matter shown and described herein and set forth in the appended claims.

What is claimed is:

1. In a cleaning apparatus:

11

(a) a pump having a liquid inlet and a liquid outlet and constituting the sole pressure source for the apparatus,
(b) flow-directing means,
(c) conduit means connecting the liquid outlet of said pump with said flow-directing means in fluid communicating relation,
(d) a plurality of sources of liquid connected in fluid communication with the liquid inlet of said pump,
(e) control means connected with one of said sources of liquid in a flow-controlling relation and controlling the flow of that liquid to the inlet of said pump,
(f) pressure-sensitive control-actuating means interposed between said pump and said flow-directing means in pressure sensing relation to the back-pressure created therebetween within said conduit means and connected to said control means in actuating relation and actuating the same in response to such back-pressure, and
(g) a single-orifice flow-control means including a manually operated valve and a pressure regulating valve positioned in said flow-directing means, said single-orifice flow-control means being movable between open and closed positions with operation of the manually operated valve between open and closed positions to cause different back-pressures to be created between said pump and said flow-directing means before permitting flow through the latter for controllably varying the magnitude of the back-pressure developed within said conduit means to control the operation of the pressure-sensitive control-actuating means.

2. The cleaning apparatus of claim 1 including manually adjustable means connected to the pressure regulating valve to adjust the same for varying back pressures.

3. The cleaning apparatus of claim 2 in which the manually adjustable pressure regulating valve cooperates with the single-orifice flow-control means to permit selection of a different back pressure to subsequently operate the pressure-sensitive control-actuating means without affecting the discharge of liquid at a constant rate of flow through said flow-directing means.

4. The cleaning apparatus of claim 1 in which the control means is a plurality of controllers each connected respectively with one of said sources of liquid in flow controlling relation and controlling the flow of that liquid to the inlet of said pump, and in which the pressure-sensitive actuating means includes a plurality of actuators each connected respectively to one of said controllers to actuate the same in response to a different back-pressure developed in the conduit immediately prior to the flow of liquid therethrough with operation of the manually operated valve in the flow-directing means from a closed to an open position.

5. The cleaning apparatus of claim 4 in which the manual adjustment of the pressure regulating valve may be such as to selectively increase and decrease the magnitude of the back pressure without affecting the discharge of liquid at a constant rate of flow through said flow-directing means.

6. The cleaning apparatus of claim 1 in which one of said liquids is a cleaning liquid connected with a positive pressure in excess of atmospheric pressure.

7. The cleaning apparatus of claim 1 in which one of said liquids is a cleaning liquid connected with a positive pressure in excess of the pressure at which the other liquid is connected to the liquid inlet of said pump.

8. The cleaning apparatus of claim 1 in which one of said sources of liquid is a pressurized source of water which includes pressure regulator disposed between said pressurized source of water and said inlet of said pump, and in which another of said liquid sources is a cleaning liquid source connected in pressure-receiving relation with said pressurized source of water supply at the high pressure side of said regulator.

9. In a cleaning apparatus:
(a) pump means constituting the sole operating pressure source for the apparatus, and having a liquid inlet and a liquid outlet;
(b) flow-directing means;
(c) conduit means connecting the liquid outlet of said pump means with said flow-directing means in fluid communicating relation;
(d) second conduit means connected at one of its ends to the liquid inlet of said pump means and adapted to be connected at its opposite end with a source of water;
(e) a substantially closed container connected to said second mentioned conduit means in liquid flowing communication.
(f) a collapsible substantially closed package disposed within said container and having its interior connected in liquid communicating relation with said second mentioned conduit means;
(g) a supply of cleaning liquid disposed within said package;
(h) a source of fluid pressure greater than the pressure within said second mentioned conduit means;
(i) pressure-transmitting means connected in a pressure-receiving relation with said source of pressure and connected in pressure-transmitting relation to said package within said container;
(j) control means connected to said pressure-transmitting means in controlling relation and controlling the pressure transmitted to said package and the cleaning liquid container therein;
(k) pressure-sensitive control-actuating means connected to said pump means and said flow-directing means in pressure-sensing relation to the back-pressure created therebetween within said first mentioned conduit means and connected to said control means in actuating relation and actuating the same in response to such back-pressure; and
(l) means connected with said first mentioned conduit means and said flow-directing means for controlling the magnitude of the back-pressure developed within said first mentioned conduit means immediately prior to the flow of liquid therethrough and for regulating the discharge of the liquid therefrom at the same operating pressure at all times.

10. In a cleaning apparatus:
(a) continuously operating pump means constituting the sole operating pressure source, and having a liquid inlet and a liquid outlet;
(b) flow-directing means;
(c) conduit means connecting the liquid outlet of said pump means with said flow-directing means in fluid communicating relation;
(d) second conduit means connected at one of its ends to the liquid inlet of said pump means and adapted to be connected at its opposite end with a pressurized source of water;
(e) a substantially closed container connected to said second mentioned conduit means;
(f) a collapsible substantially closed package disposed within said container and having its interior connected in liquid communicating relation with said second mentioned conduit means;
(g) a supply of cleaning liquid disposed within said package;
(h) a source of pressure greater than the pressure within said second mentioned conduit means;
(i) pressure-transmitting means connected in pressure receiving relation with said source of pressure and connected in pressure transmitting relation to said package within said container;
(j) control means connected to said pressure-transmitting means in controlling relation and controlling the pressure transmitted to said package and the cleaning liquid contained therein; and (k) pressure sensitive control-actuating means interposed between said pump means and said flow-directing means in pressure-sensing relation to the back-pressure created therebetween within said first mentioned conduit means and connected to said control means in actuating relation and actuating the same in response to such back-pressure.

11. In a cleaning apparatus:
(a) pump means constituting the sole operating pressure source, and having a liquid inlet and a liquid outlet;
(b) flow-directing means;
(c) conduit means connecting the liquid outlet of said pump means with said flow-directing means in fluid communicating relation;
(d) second conduit means connected at one of its ends to the liquid inlet of said pump means and adapted to be connected at its opposite end with a pressurized source of water;
(e) a substantially closed container connected to said second mentioned conduit means;
(f) a collapsible substantially closed package disposed within said container and having its interior connected in liquid communicating relation with said second mentioned conduit means;
(g) a supply of cleaning liquid disposed within said package;
(h) third conduit means connecting the liquid outlet of said pump means with the interior of said container;
(i) control means connected to said third mentioned conduit means in fluid pressure-controlling relation and controlling the fluid pressure transmitted therethrough to said container;
(j) pressure sensitive control-actuating means interposed between said pump means and said flow-directing means in pressure-sensing relation to the back-pressure created therebetween within said first mentioned conduit means and connected to said control means in actuating relation and actuating the same in response to such back-pressure; and
(k) means connected with said first mentioned conduit means and said flow-directing means for controlling the magnitude of the back-pressure developed within said first mentioned conduit means immediately prior to the flow of liquid therethrough and for regulating the discharge of the liquid therefrom at the same operating pressure at all times.

12. In a cleaning apparatus:
(a) pump means constituting the sole operating pressure source, and having a liquid inlet and a liquid outlet;
(b) flow-directing means;
(c) conduit means connecting the liquid outlet of said pump means with said flow-directing means in fluid communicating relation;
(d) second conduit means connected at one of its ends to the liquid inlet of said pump means and adapted to be connected at its opposite end with a source of water;
(e) a substantially closed container connected to said second mentioned conduit means;
(f) a collapsible substantially closed package disposed within said container and having its interior connected in liquid communicating relation with said second mentioned conduit means;
(g) a supply of cleaning liquid disposed within said package;
(h) third conduit means connecting the liquid outlet of said pump means with the interior of said container;
(i) fourth conduit means connecting said third mentioned conduit means with said second mentioned conduit means;
(j) valve means interposed within said fourth mentioned conduit means and controlling the fluid pressure transmitted therethrough;
(k) control means connected to said third mentioned conduit means in controlling relation and controlling the pressure transmitted therethrough to said package and the cleaning liquid contained therein;
(l) pressure sensitive control- and valve-actuating means interposed between said pump means and said flow-directing means in pressure-sensing relation to the back-pressure created therebetween within said first mentioned conduit means and connected to said valve means and said control means in actuating relation and actuating the same in response to such back-pressure; and
(m) means connected with said first mentioned conduit means and said flow-directing means for controlling the magnitude of the back-pressure developed within said first mentioned conduit means immediately prior to the flow of liquid therethrough and for regulating the discharge of the liquid therefrom at the same operating pressure at all times.

13. The structure defined in claim 12 wherein said last mentioned means includes a valve element movable between a restricted flow position to a relatively non-restricted flow position and being resiliently urged toward said restricted flow position; and
(n) threaded means for adjusting the extent to which said valve element is resiliently urged toward restricted flow position.

14. In a cleaning apparatus:
(a) pump means having a liquid inlet and a liquid outlet;
(b) flow-directing means;
(c) conduit means connecting the liquid outlet of said pump means with said flow-directing means in fluid communicating relation;
(d) second conduit means connected at one of its ends to the liquid inlet of said pump means and adapted to be connected at its opposite end with a source of water under relatively high pressure;
(e) pressure regulating means interposed within said second conduit means for reducing the pressure of water flowing through said second conduit means to the liquid inlet of said pump means;
(f) a substantially closed container connected to said second mentioned conduit means at a point disposed between said regulating means and the liquid inlet of said pump means;
(g) a collapsible substantially closed package disposed within said container and having its interior connected in liquid-communicating relation with said second mentioned conduit means through said container;
(h) a supply of cleaning liquid disposed within said package;
(i) third conduit means connecting the interior of said container with said second mentioned conduit means at the high pressure side of said pressure regulating means;
(j) control means connected with said first mentioned conduit means in controlling relation and controlling whether the fluid pressure is transmitted to the exterior of said package within said container through said first mentioned conduit means;
(k) second control means connected with said third mentioned conduit means in controlling relation and controlling whether the fluid pressure is transmitted through said third mentioned conduit to the interior of said container.
(l) pressure sensitive control-actuating means interposed between said pump means and said flow-directing means in pressure-sensing relation to the back-pressure created therebetween within said first mentioned conduit means and connected to each of said control means in actuating relation and actuating the same in coordinated relation in response to such back-pressure; and (m) means carried by said flow-directing means for controlling the magnitude of the back-pressure developed within said first mentioned conduit means.

15. The structure defined in claim 10 wherein said liquid containing package is disposable and includes means inherent therein to prevent collapsing thereof transversely of said container as a result of pressure being applied thereto by a flow of water within said first mentioned conduit means.

16. An applicator of pressurized liquids comprising:
(a) flow-directing means having a liquid discharge for directing flow of the liquids against a surface to be cleaned;
(b) conduit means connected with said flow-directing means in liquid communication therewith and adapted to be connected to liquids under pressure and to carry such liquids under pressure to said flow-directing means;
(c) manually operated valve means connected with said conduit means for opening and closing the same to permit and terminate, respectively, flow of such liquids therethrough as desired; and
(d) an adjustable single-orifice back-pressure regulator disposed within said conduit means and predetermining the magnitude of the back-pressure within said conduit means immediately prior to the flow of liquid through said flow-directing means and regulating the discharge of the liquid therefrom at the same operating pressure at all times, said manually operated valve means for opening and closing said conduit, and said adjustable single-orifice back-pressure regulator being positioned in the flow-directing means, and means on the flow-directing means and connected to the back-pressure regulator for adjustably setting the magnitude of said back-pressure.

17. The structure defined in claim 16 wherein said back-pressure regulator includes a valve seat, disposed within said conduit means, a back-pressure sensitive valve member within said conduit means being movable into and out of valve-seat engaging position, having a tapered valve-seat engaging surface, and resilient means urging said valve member into valve-seat engaging position, and means for readily increasing and decreasing the extent of such urging by said resilient means.

18. The structure defined in claim 17 wherein said valve member has a forward end with an axial bore extending inwardly therefrom and a transverse bore communicating with said axial bore and disposed rearwardly of said forward end and communicating at all times with said conduit means.

19. An applicator of pressurized liquids comprising:
(a) flow-directing means having a liquid discharge for directing flow of the liquids against a surface to be cleaned,
(b) conduit means connected with said flow-directing means in liquid communication therewith and adapted to be connected to liquids under pressure and to carry such liquids under pressure to said flow-directing means,
(c) means connected with said conduit means for opening and closing the same to permit and terminate, respectively, flow of such liquids therethrough as desired,
(d) an adjustable back-pressure regulator disposed within said conduit means and predetermining the magnitude of the back-pressure within said conduit means immediately prior to the flow of liquid through said flow-directing means and regulating the discharge of the liquid therefrom at the same operating pressure at all times, and
(e) said back-pressure regulator including;
(1) a valve-seat disposed within said conduit means,
(2) a valve member extending into said conduit means and being movable into and out of valve-seat engaging position,
(3) resilient means urging said valve member into engaging relation with said valve-seat,
(4) means for varying the extent of such urging of said resilient means,
(5) said valve member including a piston extending into said conduit means and urged away from said valve-seat and against said resilient means by the fluid pressure within said conduit means,
(6) a valve head carried by said piston opposite said valve-seat and movable with said piston into and out of engagement with said valve-seat, and
(7) said valve head having a tapered valve-seat engaging end and having a transverse bore and an axial bore extending inwardly through the forward end thereof and communicating with said transverse bore and said piston.

20. The structure defined in claim 19 and means loosely connecting said head over the forward end of said piston.

21. The structure defined in claim 19 wherein said valve head extends over the forward end of said piston, and means interconnecting said valve head with said piston for movement therewith, said interconnecting means being constructed and arranged to permit limited relative axial movement between said piston and said valve head.

22. The structure defined in claim 19 wherein said valve head is carried by the forward end of said piston, and means interconnecting said valve head with said piston for movement therewith, said interconnecting means being constructed and arranged to permit limited relative axial movement between said piston and said valve head.

23. The structure defined in claim 19 wherein said valve head is carried by the forward end of said piston, and means interconnecting said valve head with said piston for movement therewith, said interconnecting means being constructed and arranged to permit limited relative axial movement between said piston and said valve head and to cause said valve head to be moved away from valve-seat engaging position by said piston only after said piston has been forced rearwardly by back-pressure in said conduit means despite the urging of said resilient means.

24. An applicator of pressurized liquids comprising:
(a) flow-directing means having a liquid discharge for directing flow of the liquids against a surface to be cleaned,
(b) conduit means connected with said flow-directing means in liquid communication therewith and adapted to be connected to liquids under pressure and to carry such liquids under pressure to said flow-directing means,
(c) means connected with said conduit means for opening and closing the same to permit and terminate, respectively, flow of such liquids therethrough as desired,
(d) an adjustable back-pressure regulator disposed within said conduit means and predetermining the magnitude of the back-pressure within said conduit means immediately prior to the flow of liquid through said flow-directing means and regulating the discharge of the liquid therefrom at the same operating pressure at all times, and
(e) said back-pressure regulator including:
(1) a valve-seat disposed within said conduit means,
(2) a back-pressure sensitive valve member within said conduit means being movable into and out of valve-seat engaging position and having a tapered valve-seat engaging surface, (3) resilient means urging said valve member into valve-seat engaging position, (4) means for readily increasing and decreasing the extent of such urging by said resilient means, (5) said resilient means including a slidable member bearing against said piston and holding the same against said valve-seat at low pressures, (6) said slidable member having a recess formed in its periphery, (7) at least one ball member received within said recess, (8) a ring member surrounding said ball member and said slidable member and having a beveled ball engaging surface to normally hold said ball member within said recess, and (9) spring means urging said ring member into ball holding position to resist rearward movement of said valve member.

References Cited

UNITED STATES PATENTS

| | | | |
|---|---|---|---|
| 1,278,926 | 9/1918 | Henrikson et al. | 239—578 |
| 1,578,944 | 3/1926 | Wilkinson | 239—322 |
| 3,049,302 | 8/1962 | Simmons | 239—585 |
| 3,140,049 | 7/1964 | Norstrud et al. | 239—304 |
| 3,226,030 | 12/1965 | Rossi | 239—305 |
| 3,246,845 | 4/1966 | Techler et al. | 239—304 |
| 3,282,473 | 10/1966 | Moore | 239—322 |

FOREIGN PATENTS

| | | |
|---|---|---|
| 123,538 | 2/1947 | Australia. |
| 658,036 | 1/1929 | France. |
| 754,269 | 10/1933 | France. |

EVERETT W. KIRBY, *Primary Examiner.*